United States Patent
Bharaj et al.

(10) Patent No.: US 12,277,753 B1
(45) Date of Patent: Apr. 15, 2025

(54) COMMON-SENSE BIAS DISCOVERY AND MITIGATION FOR MACHINE-LEARNING TASKS

(71) Applicant: Reality Defender, Inc., New York, NY (US)

(72) Inventors: Gaurav Bharaj, San Francisco, CA (US); Miao Zhang, Jersey City, NJ (US); Zee Fryer, Oakland, CA (US); Ben Colman, New York, NY (US); Ali Shahriyari, Las Vegas, NV (US)

(73) Assignee: Reality Defender, Inc., New York, NY (US)

( * ) Notice: Subject to any disclaimer, the term of this patent is extended or adjusted under 35 U.S.C. 154(b) by 0 days.

(21) Appl. No.: 18/751,166

(22) Filed: Jun. 21, 2024

Related U.S. Application Data

(60) Provisional application No. 63/600,577, filed on Nov. 17, 2023.

(51) Int. Cl.
*G06V 10/774* (2022.01)
*G06V 10/75* (2022.01)
*G06V 10/82* (2022.01)

(52) U.S. Cl.
CPC .......... *G06V 10/774* (2022.01); *G06V 10/751* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2023/0153687 A1* | 5/2023 | Vu | G06N 3/0895 706/12 |
| 2024/0013522 A1* | 1/2024 | Gubbi Lakshminarasimha | G06T 11/001 |

OTHER PUBLICATIONS

Agrawal et al. "VQA: Visual Question Answering," IEEE international conference on computer vision, Dec. 7-13, 2015, Santiago, Chile; pp. 1-25.

Ahn et al. "Mitigating dataset bias by using per-sample gradient," ICCLR 2023, May 1-5, 2023, Kigali, Rwanda; pp. 1-36.

Alayrac et al. "Flamingo: a Visual Language Model for Few-Shot Learning," NeurIPS 2022: 36th Conference on Neural Information Processing Systems, Nov. 28-Dec. 9, 2022, New Orleans, Louisiana; pp. 1-54.

(Continued)

*Primary Examiner* — Leon Flores
(74) *Attorney, Agent, or Firm* — Morrison & Foerster LLP

(57) ABSTRACT

An exemplary method for reducing bias in a training image dataset for training a machine-learning model comprises: receiving a plurality of text strings comprising at least one text string describing each image in the training image dataset; generating a plurality of embeddings based on the plurality of text strings; identifying, based on the plurality of embeddings, a plurality of visual features in the training image dataset; identifying one or more correlations between the plurality of visual features in the training image dataset; receiving a user input identifying at least one biased correlation from the one or more correlations; and training the machine-learning model at least partially by adjusting one or more data sampling weights associated with one or more training images in the training image dataset based on the user input.

17 Claims, 10 Drawing Sheets
(6 of 10 Drawing Sheet(s) Filed in Color)

(56) References Cited

OTHER PUBLICATIONS

Amini et al. "Uncovering and Mitigating Algorithmic Bias through Learned Latent Structure," 2019 AAAI/ACM Conference on AI, Ethics, and Society, Jan. 27-28, 2019, Honolulu, Hawaii; pp. 289-295.
Amini et al. "Variational Autoencoder for End-to-End Control of Autonomous Driving with Novelty Detection and Training Debiasing," 2018 IEEE/RSJ International Conference on Intelligent Robots and Systems, Oct. 1-5, 2018, Madrid, Spain; 9 pages.
Bahng et al. "Learning De-biased Representations with Biased Representations," 37th International Conference on Machine Learning, Jul. 13-18, 2020, Vienna, Austria; 17 pages.
Basu et al. (May 2023). "Inspecting the Geographical Representativeness of Images from Text-to-Image Models," Indian Institute of Science; 15 pages.
Bommasani et al. (Aug. 2021). "On the Opportunities and Risks of Foundation Models," Center for Research on Foundation Models (CRFM) and Stanford Institute for Human-Centered Artificial Intelligence (HAI); pp. 1-214.
Brown et al. (Jun. 2023). "Detecting shortcut learning for fair medicalAI using shortcut testing," Nature Communications 14(4314); pp. 1-10.
Cer et al. (Mar. 2018). "Universal Sentence Encoder," Google Research; 7 pages.
Zhang et al. (Mar. 2022). "Correct-n-Contrast: A Contrastive Approach for Improving Robustness to Spurious Correlations," located at https://arxiv.org/abs/2203.01517; pp. 1-38.
Chen et al. (Apr. 2015). "Microsoft COCO Captions: Data Collection and Evaluation Server," located at https://arxiv.org/abs/1504.00325; pp. 1-7.
Diomataris et al. "Grounding Consistency: Distilling Spatial Common Sense for Precise Visual Relationship Detection," Proceedings of the IEEE/CVF International Conference on Computer Vision, Oct. 10-17, 2021, Montreal, Canada; pp. 15911-15920.
Dunlap et al. "Using language to extend to unseen domains," The Eleventh International Conference on Learning Representations, Apr. 25-29, 2022, Virtual Event, Austria; pp. 1-19.
Hendrycks et al. "Benchmarking neural network robustness to common corruptions and perturbations," International Conference on Learning Representations, May 6-9, 2019, New Orleans, Louisiana; pp. 1-16.
Jia et al. "Scaling Up Visual and Vision-Language Representation Learning With Noisy Text Supervision," 38th International Conference on Machine Learning, Jul. 18-24, 2021, Virtual Event; 14 pages.
Jiang et al. "Talk-to-Edit: Fine-Grained Facial Editing via Dialog," IEEE/CVF International Conference on Computer Vision, Oct. 10-17, 2021, Montreal, Canada; pp. 1-22.
Karpathy et al. "Deep Visual-Semantic Alignments for Generating Image Descriptions," IEEE conference on computer vision and pattern recognition, Jun. 7-12, 2015, Los Alamitos, California; pp. 3128-3137.
Khattak et al. "MaPLe: Multi-modal Prompt Learning," IEEE/CVF Conference on Computer Vision and Pattern Recognition, Jun. 18-22, 2023, Vancouver, Canada; 13 pages.
Kim et al. "BiaSwap: Removing Dataset Bias with Bias-Tailored Swapping Augmentation," IEEE/CVF International Conference on Computer Vision, Oct. 10-17, 2021, Montreal, Canada; 14 pages.
Krishnakumar et al. (2021) "UDIS: Unsupervised Discovery of Bias in Deep Visual Recognition Models," British Machine Vision Conference (BMVC) 1; pp. 1-40.
Lake et al. (2017). "Building Machines That Learn and Think Like People," Behavioral and Brain Sciences 40(e253); pp. 1-58.
Lang et al. "Explaining in Style: Training a GAN to explain a classifier in StyleSpace," IEEE/CVF International Conference on Computer Vision, Oct. 10-17, 2021, Montreal, Canada; 10 pages.
LeCun et al. (2010) "The MNIST Database of handwritten digits," The Courant Institute of Mathematical Sciences and Google Labs; 8 pages.
Li et al. "Discover and Mitigate Unknown Biases with Debiasing Alternate Networks," European Conference on Computer Vision, Oct. 23-27, 2022, Tel Aviv, Israel; pp. 1-39.
Li et al. "Discover the Unknown Biased Attribute of an Image Classifier," IEEE/CVF International Conference on Computer Vision, Oct. 10-17, 2021, Montreal, Canada; 22 pages.
Li et al. "REPAIR: Removing Representation Bias by Dataset Resampling," IEEE/CVF conference on computer vision and pattern recognition, Jun. 15-20, 2019, Long Beach, California; 10 pages.
Li et al. (2020). "A Deeper Look at Facial Expression Dataset Bias," IEEE Transactions on Affective Computing 13(2); pp. 1-15.
Lin et al. "Microsoft COCO: Common Objects in Context," Computer Vision—ECCV 2014: 13th European Conference, Sep. 6-12, 2014, Zurich, Switzerland; pp. 1-15.
Liu et al. "Deep Learning Face Attributes in the Wild," IEEE international conference on computer vision, Dec. 7-13, 2015, Santiago, Chile; 11 pages.
Liu et al. "Just Train Twice: Improving Group Robustness without Training Group Information," International Conference on Machine Learning, Jul. 18-24, 2021, Virtual Conference; 16 pages.
Lloyd, S. P. (Mar. 1982). "Least Squares Quantization in PCM," IEEE Transactions on Information Theory IT-28(2); pp. 129-137.
Manjunatha et al. "Explicit Bias Discovery in Visual Question Answering Models," IEEE/CVF Conference on Computer Vision and Pattern Recognition, Jun. 15-20, 2019, Long Beach, California; pp. 1-10.
Matthews, B. W. (May 1975). "Comparison of the Predicted and Observed Secondary Structure of T4 Phage Lysozyme," Biochimica et Biophysica Acta; pp. 443-451.
McInnes et al. (Sep. 21, 2020). "UMAP: Uniform Manifold Approximation and Projection for Dimension Reduction," located at https://arxiv.org/abs/1802.03426; pp. 1-63.
Misra et al. "Seeing through the Human Reporting Bias: Visual Classifiers from Noisy Human-Centric Labels," IEEE conference on computer vision and pattern recognition, Jun. 27-30, 2016, Las Vegas, Nevada; pp. 1-10.
Nam et al. (2020). "Learning from Failure: Training Debiased Classifier from Biased Classifier," Advances in Neural Information Processing Systems; pp. 1-19.
Park et al. "Fair Contrastive Learning for Facial Attribute Classification," IEEE/CVF Conference on Computer Vision and Pattern Recognition, Jun. 18-24, 2022, New Orleans, Louisiana; pp. 1-19.
Qraitem et al. "Bias Mimicking: A Simple Sampling Approach for Bias Mitigation," IEEE/CVF Conference on Computer Vision and Pattern Recognition, Jun. 18-22, 2023, Vancouver, Canada; pp. 1-13.
Radford et al. "Learning Transferable Visual Models From Natural Language Supervision," International conference on machine learning, Jul. 18-24, 2021, Virtual Conference; 48 pages.
Radford et al. (2019). "Language Models are Unsupervised Multitask Learners," located at https://www.semanticscholar.org/paper/Language-Models-are-Unsupervised-Multitask-Learners-Radford-Wu/9405cc0d6169988371b2755e573cc28650d14dfe; 24 pages.
Ramaswamy et al. "Fair Attribute Classification through Latent Space De-biasing," IEEE/CVF conference on computer vision and pattern recognition, Jun. 20-25, 2021, Nashville, Tennessee; pp. 1-15.
Rombach et al. "High-Resolution Image Synthesis with Latent Diffusion Models," the IEEE/CVF conference on computer vision and pattern recognition, Jun. 18-24, 2022, New Orleans, Louisiana; pp. 1-45.
Schramowski et al. (2022). "Large Pre-trained Language Models Contain Human-like Biases of What is Right and Wrong to Do," Nature Machine Intelligence 4(3); pp. 1-38.
Seo et al. "Unsupervised Learning of Debiased Representations with Pseudo-Attributes," IEEE/CVF Conference on Computer Vision and Pattern Recognition, Jun. 18-24, 2022, New Orleans, Louisiana; 15 pages.

(56) References Cited

OTHER PUBLICATIONS

Sharma et al. "Data Augmentation for Discrimination Prevention and Bias Disambiguation," AAAI/ACM Conference on AI, Ethics, and Society, Feb. 7-8, 2020, New York, New York; pp. 358-364.

Singh et al. "Don't Judge an Object by Its Context: Learning to Overcome Contextual Bias," IEEE/CVF Conference on Computer Vision and Pattern Recognition, Jun. 13-19, 2020, Seattle, Washington; 14 pages.

Sohn et al. "Visual Prompt Tuning for Generative Transfer Learning," IEEE/CVF Conference on Computer Vision and Pattern Recognition, Jun. 17-24, 2023, Vancouver, Canada; pp. 1-36.

Sohoni et al. (Apr. 2022). "No Subclass Left Behind: Fine-Grained Robustness in Coarse-Grained Classification Problems," Advances in Neural Information Processing Systems; pp. 1-40.

Tian et al. (Feb. 2022). "Image fairness in deep learning: problems, models, and challenges," Neural Computing and Applications 34; pp. 12875-12893.

Torralba et al. "Unbiased Look at Dataset Bias," IEEE International Conference on Automation Science and Engineering, Aug. 24-27, 2011, Shanghai, China; pp. 1521-1528.

Truong et al. "FREDOM: Fairness Domain Adaptation Approach to Semantic Scene Understanding," IEEE/CVF Conference on Computer Vision and Pattern Recognition, Jun. 17-24, 2023, Vancouver, Canada; 10 pages.

Wang et al. "Designing Theory-Driven User-Centric Explainable AI," 2019 CHI conference on human factors in computing systems, May 4-9, 2019, Glasgow, United Kingdom; 16 pages.

Wang et al. "Overwriting Pretrained Bias with Finetuning Data," Proceedings of the IEEE/CVF International Conference on Computer Vision, Oct. 1-6, 2023, Paris, France; 15 pages.

Wang et al. "Towards Fairness in Visual Recognition: Effective Strategies for Bias Mitigation," IEEE/CVF conference on computer vision and pattern recognition, Jun. 13-19, 2020, Seattle, Washington; 10 pages.

Wu et al. "Discover and Cure: Concept-aware Mitigation of Spurious Correlation," 40th International Conference on Machine Learning, Jul. 23-29, 2023, Honolulu, Hawaii; pp. 1-22.

Wu et al. "Unified Visual-Semantic Embeddings: Bridging Vision and Language with Structured Meaning Representations," IEEE/CVF Conference on Computer Vision and Pattern Recognition, Jun. 15-20, 2019, Long Beach, California; pp. 6609-6618.

Wu et al. (2022). "A Survey of Human-in-the-Loop for Machine Learning," Future Generation Computer Systems; pp. 1-22.

Yuan et al. (2021). "Florence: A New Foundation Model for Computer Vision," located at https://arxiv.org/abs/2111.11432; 17 pages.

Zhang et al. "CLAMP: Prompt-based Contrastive Learning for Connecting Language and Animal Pose," IEEE/CVF Conference on Computer Vision and Pattern Recognition, Jun. 18-22, 2023, Vancouver, Canada; 15 pages.

Zhang et al. "Diagnosing and Rectifying Vision Models Using Language," International Conference on Learning Representations, May 1-5, 2023, Kigali, Rwanda; pp. 1-27.

Zhang et al. "Fairness-aware Contrastive Learning with Partially Annotated Sensitive Attributes," The Eleventh International Conference on Learning Representations, Apr. 25-29, 2022, Virtual Conference; pp. 1-18.

Zhang et al. "GLIPv2: Unifying Localization and VL Understanding," Advances in Neural Information Processing Systems, Nov. 28-Dec. 9, 2022, New Orleans, Louisiana; pp. 1-25.

Zhong et al. "RegionCLIP: Region-based Language-Image Pretraining," IEEE/CVF Conference on Computer Vision and Pattern Recognition, Jun. 18-24, 2022, New Orleans, Louisiana; pp. 1-12.

* cited by examiner

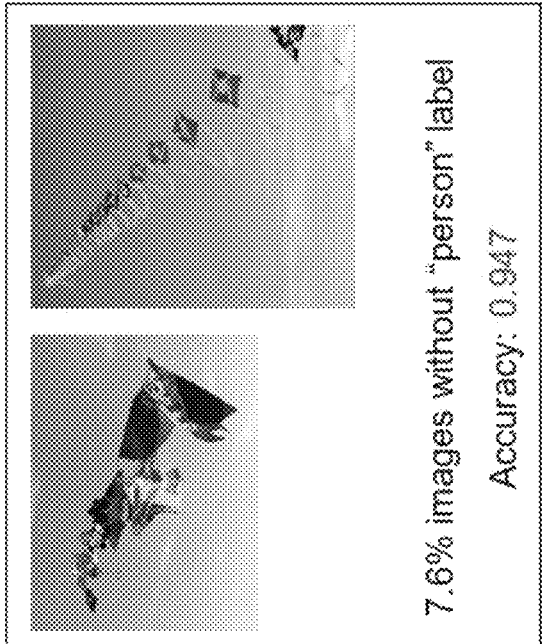
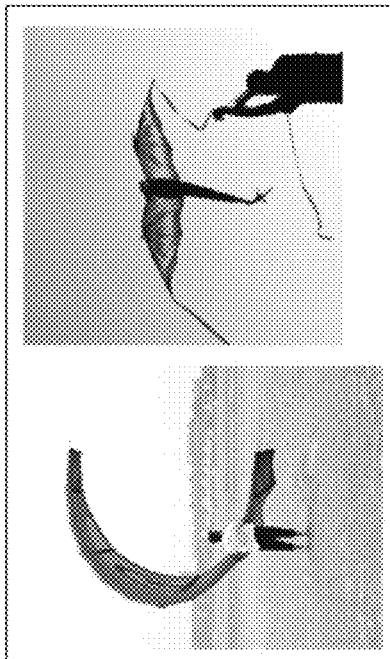
FIG. 1

| Target | Vanilla | | LiF [39] | | DebiAN [30] | |
|---|---|---|---|---|---|---|
| | Worst($\uparrow$) | Avg. ($\uparrow$) | Worst($\uparrow$) | Avg. ($\uparrow$) | Worst($\uparrow$) | Avg.($\uparrow$) |
| Smiling | 0.894 (3e-3) | 0.919 (2e-3) | 0.730 (0.03) | 0.841 (7e-3) | 0.895 (0.01) | 0.916 (7e-3) |
| Eyeglasses | 0.926 (3e-4) | 0.964 (2e-3) | 0.810 (0.02) | 0.911 (3e-3) | 0.928 (0.01) | 0.964 (8e-3) |

| PGD [1] | | BPA [47] | | CSBD (ours) | |
|---|---|---|---|---|---|
| Worst($\uparrow$) | Avg. ($\uparrow$) | Worst($\uparrow$) | Avg. ($\uparrow$) | Worst ($\uparrow$) | Avg.($\uparrow$) |
| 0.888 (0.02) | 0.917 (1e-3) | 0.899 (3e-3) | 0.912 (6e-3) | 0.908 (3e-3) | 0.918 (8e-4) |
| 0.917 (8e-3) | 0.960 (3e-3) | 0.929 (5e-3) | 0.962 (2e-3) | 0.938 (2e-3) | 0.965 (1e-3) |

FIG. 6

| Feature 1 | Feature 2 | φ | Feature 1 | Feature 2 | φ |
|---|---|---|---|---|---|
| "sky", "air" | "a man", "a boy" | 0.0558 | "table" | "plate" | 0.123 |
| "sky", "air" | "skateboard" | 0.1252 | "living room" | "pillow" | 0.1643 |
| "a man" | "surfboard" | 0.1102 | "kitchen" | "scissors" | 0.0894 |
| "giraffe" | "trees" | 0.1644 | "a pot" | "flower" | 0.2277 |
| "giraffe" | "fence" | 0.0745 | "cake" | "box" | 0.1151 |
| "sheep" | "birds" | 0.0794 | "pizza" | "tray" | 0.1309 |
| "sink" | "window" | 0.0850 | "beach" | "kite" | 0.1347 |
| "bathroom" | "vase" | 0.1229 | "clock" | "building" | 0.1026 |
| "microwave", "oven" | "dishes" | 0.0604 | "a flattened area" | "train" | 0.093 |

FIG. 7

| Target | Sensitive | Vanilla Worst(↑) | Vanilla Avg. (↑) | LtF [39] Worst (↑) | LtF [39] Avg. (↑) | DabiAN [30] Worst (↑) | DabiAN [30] Avg. (↑) |
|---|---|---|---|---|---|---|---|
| Cat | Couch | 0.849 (0.04) | 0.935 (8e-3) | 0.800 (0.04) | 0.916 (0.01) | 0.821 (0.01) | 0.902 (9e-3) |
| Cat | Keyboard | 0.948 (1e-3) | 0.972 (8e-3) | 0.870 (0.04) | 0.938 (9e-3) | 0.917 (4e-3) | 0.949 (2e-3) |
| Dog | Frisbee | 0.883 (9e-3) | 0.927 (8e-3) | 0.821 (0.04) | 0.893 (0.02) | 0.845 (0.02) | 0.895 (2e-3) |
| TV | Chair | 0.726 (8e-3) | 0.893 (2e-3) | 0.690 (0.02) | 0.867 (8e-3) | 0.718 (0.01) | 0.876 (3e-3) |
| Umbrella | Person | 0.761 (0.01) | 0.880 (2e-3) | 0.771 (4e-3) | 0.854 (5e-3) | 0.716 (0.04) | 0.857 (0.01) |
| Kite | Person | 0.937 (0) | 0.963 (4e-4) | 0.854 (0.02) | 0.923 (7e-3) | 0.941 (0.02) | 0.960 (6e-3) |

| PGD [1] Worst (↑) | PGD [1] Avg. (↑) | BPA [47] Worst (↑) | BPA [47] Avg. (↑) | CSBD (ours) Worst (↑) | CSBD (ours) Avg. (↑) |
|---|---|---|---|---|---|
| 0.884 (8e-3) | 0.940 (3e-3) | 0.853 (0.00) | 0.925 (8e-3) | 0.906 (4e-3) | 0.941 (3e-3) |
| 0.947 (7e-4) | 0.977 (3e-4) | 0.890 (0.05) | 0.952 (0.02) | 0.953 (1e-3) | 0.976 (6e-4) |
| 0.872 (6e-3) | 0.940 (4e-3) | 0.854 (0.02) | 0.905 (8e-3) | 0.903 (8e-3) | 0.934 (8e-3) |
| 0.821 (7e-3) | 0.907 (3e-3) | 0.758 (0.02) | 0.887 (7e-3) | 0.842 (7e-3) | 0.911 (8e-3) |
| 0.763 (0.01) | 0.887 (2e-3) | 0.777 (0.02) | 0.878 (8e-3) | 0.814 (9e-3) | 0.892 (1e-3) |
| 0.955 (1e-3) | 0.955 (1e-3) | 0.921 (8e-3) | 0.957 (2e-3) | 0.945 (7e-3) | 0.960 (3e-3) |

FIG. 8

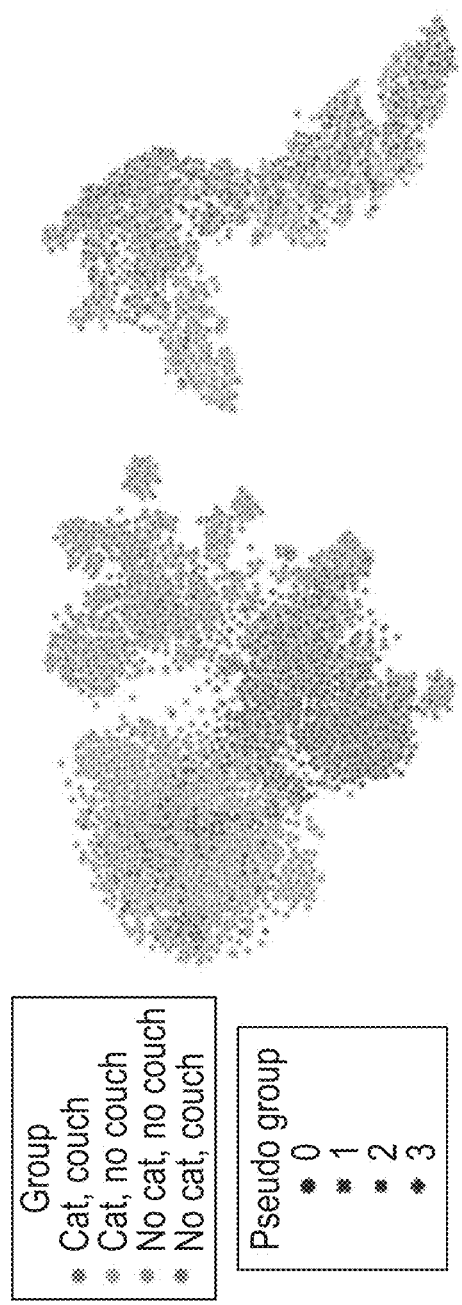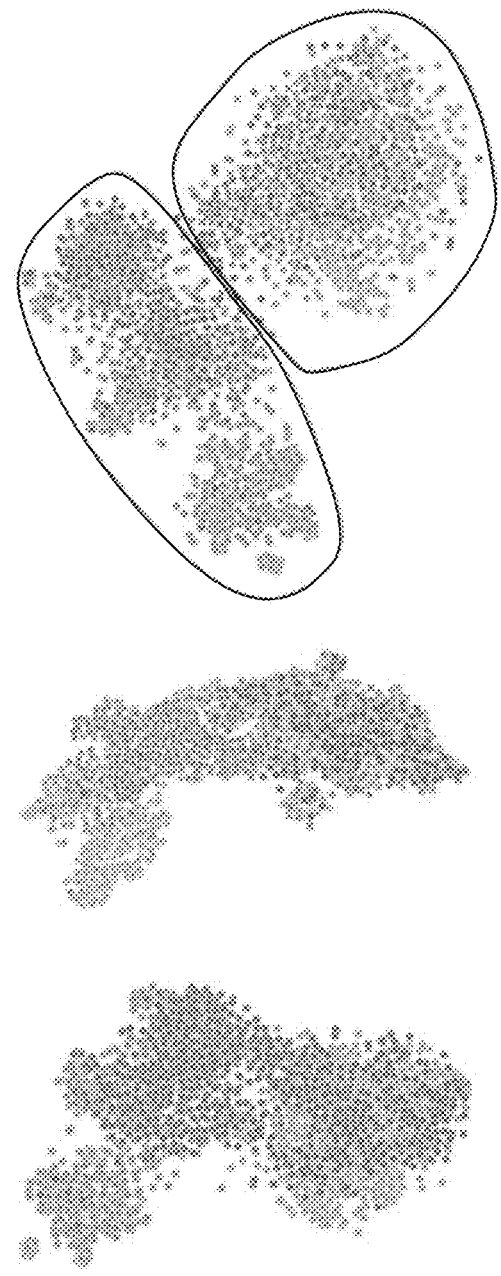
FIG. 9A Vanilla (no mitigation)
FIG. 9B DebiAN
FIG. 9C PGD
FIG. 9D BPA
FIG. 9E CSBD

COMMON-SENSE BIAS DISCOVERY AND MITIGATION FOR MACHINE-LEARNING TASKS

CROSS-REFERENCE TO RELATED APPLICATIONS

This application claims the benefit of U.S. Provisional Application No. 63/600,577, filed on Nov. 17, 2023, the entire contents of which are incorporated herein by reference for all purposes.

FIELD

The present disclosure relates to identification and mitigation of bias in training data for machine-learning models such as classification models.

BACKGROUND

Computer vision has been deployed with dramatically more diverse data (both realistic and generative) in recent years, which has drawn attention to the inherent bias in many datasets. One common bias is due to the co-occurrence of target features with auxiliary context or background features, which models may rely on in making predictions even though the relationship is not robust and generalizable. For example, in the Microsoft Common Objects in Context (MS COCO) dataset, 92.4% of kite images include one or more people, while only 7.6% include no people. Thus, if the MS COCO dataset is used to train a kite classification model (where the classification target is kite), the frequent co-occurrence of people and kite can affect model prediction. Indeed, such kite classification model may be more accurate when classifying an image containing both a kite and people than when classifying an image containing only a kite, indicating that the model is biased toward images containing people. As another example, the set of images depicting "smile" in a dataset may contain more images of women smiling than images of men smiling. Thus, if such a dataset is used to train a smile classification model (where the classification target is smile), the frequent co-occurrence of women and smile can affect model prediction. Such smile classification model may be more accurate when classifying an image depicting a woman than when classifying an image depicting a man, indicating that the model is biased toward images depicting women. Sensitive features like this are of multiple types and may cause different downstream biases.

Current bias detection algorithms have diagnosed such co-occurrences from model encoded representations, based on the representations' varied sensitivity to different auxiliary features. However, these methods rely on image-based embeddings and thus are limited to only identifying certain kinds of bias that could be captured in that embedding space. For example, previous studies have shown that visual features that occupy smaller spatial area can lead to worse representations. Therefore, subtle facial features such as eyeglasses frames or small object features like a keyboard nearby a cat can be overlooked for bias modeling.

These observations suggest that modeling with additional data modalities, specifically text descriptions of images, may be beneficial in bridging this gap in bias detection. Such an approach of "common-sense reasoning" by natural language may allow high-level abstract understanding of images and reasoning for subtle image features, and thus can facilitate better dataset diagnosis and bias discovery than relying on the image modality alone. There have been some early explorations in this direction. However, the use cases of the existing common-sense bias modeling are limited in two major aspects: First, though text-based features can be more diverse than traditional image-based patterns, they are limited by the prior knowledge of the humans writing them and cannot expose unlabeled or subtle features in a dataset. Second, the additional step of embedding space alignment using models like CLIP or generative models lacks the ability to control fine-grained image regions with text and may inherit extra bias from the models.

SUMMARY

Disclosed herein are systems, electronic devices, methods, apparatuses, and non-transitory storage media for reducing bias in a training image dataset for training a machine-learning model. Given a corpus of pairs of images and corresponding text descriptions (e.g., descriptive captions for the images), the system can distill the corpus into a hierarchy of categories (major subjects in the images) and subordinate features (different attributes or states of a subject) via text embedding clustering. The features are extracted from the semantic components of the descriptions so they represent image content comprehensively, not limited by prior knowledge or cross-modal alignment. The system can then identify pairwise feature correlations based on their occurrence across all data samples. It should be noted that identified correlated features are not necessarily biased: for example, a correlation between "teeth" and "smile" in a dataset of face images is both expected and benign. Thus, a human-in-the-loop step can be provided, where a human user such as a domain expert reviews the identified correlations and selects the ones that may negatively impact the downstream classification task (i.e., sensitive/spurious correlations). Finally, based on the selected correlations, the system can automatically mitigate model bias, for example, via a data re-weighting strategy, without a requirement for sensitive group labels.

An exemplary system can receive a plurality of text strings comprising at least one text string describing each image in the training image dataset and generate a plurality of embeddings based on the plurality of text strings. The system can then identify, based on the plurality of embeddings, a plurality of visual features in the training image dataset and further identify one or more correlations between the plurality of visual features in the training image dataset. The system can present the one or more correlations to a user, and the user can indicate whether each of the one or more correlations is benign or not. The system can receive a user input identifying at least one biased correlation from the one or more correlations and train the machine-learning model at least partially by adjusting one or more data sampling weights associated with one or more training images in the training image dataset based on the user input.

Accordingly, embodiments of the present disclosure can discover comprehensive sensitive correlations in a dataset based on common-sense descriptions and mitigate biases which have not been explored in literature. The common-sense reasoning approach can discover human-interpretable "feature clusters" (beyond the image embedding level) existing in image datasets. Based on the clusters, a formulation is provided to derive pairwise image feature correlations, order them by significance, and allow human domain experts to identify sensitive correlations for further intervention. The approach leads to a new perspective on bias problems and resolves the limitation of latent space based de-biasing, which tends to overlook or mis-identify non-dominant features. Embodiments of the present disclosure can apply common-sense reasoning to descriptions generated by humans, which will naturally highlight the features most relevant or noticeable to humans regardless of their size or subtlety in the overall image, and indicates how their correlation to the target will cause downstream bias. Empirical evidence show that embodiments of the present disclosure can discover novel subtle sensitive features and model biases for classification tasks, which has not been previously identified and addressed. Furthermore, the system can adjust data sampling weights and achieve state-of-the-art results bias mitigation results. Thus, embodiments of the present disclosure can improve the functioning of the computer system, result in more efficient training of machine-learning models with reduced bias, and facilitate identification/retraining of biased machine-learning models.

An exemplary method for reducing bias in a training image dataset for training a machine-learning model comprises: receiving a plurality of text strings comprising at least one text string describing each image in the training image dataset; generating a plurality of embeddings based on the plurality of text strings; identifying, based on the plurality of embeddings, a plurality of visual features in the training image dataset; identifying one or more correlations between the plurality of visual features in the training image dataset; receiving a user input identifying at least one biased correlation from the one or more correlations; and training the machine-learning model at least partially by adjusting one or more data sampling weights associated with one or more training images in the training image dataset based on the user input.

In some embodiments, the machine-learning model is an image classification model, an object recognition model, an object segmentation model, or any combination thereof.

In some embodiments, training the machine-learning model comprises: adjusting one or more data sampling weights associated with one or more training images in the training image dataset based on the user input. In some embodiments, the one or more data sampling weights are adjusted to reduce the at least one biased correlation.

In some embodiments, the method further comprises determining, based on the user input, if one or more machine-learning models trained using the training image dataset is biased.

In some embodiments, generating the plurality of embeddings comprises: for each image in the training image dataset: extracting one or more tokens from the at least one text string describing the respective image; generating, based on each extracted token, an embedding using an encoder model. In some embodiments, the encoder model is a Universal Sentence Encoder (USE) or a Contrastive Language-Image Pretraining (CLIP) model.

In some embodiments, identifying the plurality of visual features in the training image dataset comprises: clustering the plurality of embeddings into a plurality of categories; and clustering embeddings in each category of the plurality of categories to identify the plurality of visual features.

In some embodiments, clustering the plurality of embeddings is performed using a K-means clustering algorithm, a hierarchical clustering algorithm, a mean shift algorithm, a Gaussian mixture model, or an agglomerative clustering algorithm.

In some embodiments, clustering the embeddings in each category is performed using a K-means clustering algorithm, a hierarchical clustering algorithm, a mean shift algorithm, a Gaussian mixture model, or an agglomerative clustering algorithm.

In some embodiments, identifying the one or more correlations between the plurality of visual features in the training image dataset comprises: calculating a measurement indicative of an association between two visual features of the plurality of visual features and comparing the measurement with a predefined threshold. In some embodiments, the measurement comprises a Matthews correlation coefficient or a Pearson coefficient.

In some embodiments, the method further comprises: displaying the one or more correlations between the plurality of visual features in the training image dataset. In some embodiments, the method further comprises: receiving a user input identifying at least one benign correlation from the one or more correlations. In some embodiments, the plurality of text strings are generated by one or more human annotators.

In some embodiments, each text string of the plurality of text strings describes a person, an object, an attribute of the person, an attribute of the object, or any combination thereof.

A non-transitory computer-readable storage medium stores one or more programs for reducing bias in a training image dataset for training a machine-learning model, the one or more programs comprising instructions, which when executed by one or more processors of an electronic device, cause the electronic device to: receive a plurality of text strings comprising at least one text string describing each image in the training image dataset; generate a plurality of embeddings based on the plurality of text strings; identify, based on the plurality of embeddings, a plurality of visual features in the training image dataset; identify one or more correlations between the plurality of visual features in the training image dataset; receive a user input identifying at least one biased correlation from the one or more correlations; and train the machine-learning model at least partially by adjusting one or more data sampling weights associated with one or more training images in the training image dataset based on the user input.

An exemplary system for reducing bias in a training image dataset for training a machine-learning model comprises: one or more processors; one or more memories; and one or more programs, wherein the one or more programs are stored in the one or more memories and configured to be executed by the one or more processors, the one or more programs including instructions for: receiving a plurality of text strings comprising at least one text string describing each image in the training image dataset; generating a plurality of embeddings based on the plurality of text strings; identifying, based on the plurality of embeddings, a plurality of visual features in the training image dataset; identifying one or more correlations between the plurality of visual features in the training image dataset; receiving a user input identifying at least one biased correlation from the one or more correlations; and training the machine-learning model at least partially by adjusting one or more data sampling weights associated with one or more training images in the training image dataset based on the user input.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 1 illustrates an exemplary process for reducing bias in a training image dataset for training a machine-learning model, in accordance with some embodiments.

FIG. 6 illustrates exemplary mitigation of common-sense bias discovered by CSBD towards the target ground truth label, in accordance with some embodiments.

FIG. 7 illustrates part of sensitively correlated features reasoned by CSBD, in accordance with some embodiments.

FIG. 8 illustrates exemplary mitigation of common-sense bias discovered by CSBD towards the target ground truth label, in accordance with some embodiments.

FIGS. 9A-E illustrates T-SNE results for cat classifiers ("Couch" as sensitive label) trained with MS-COCO dataset, in accordance with some embodiments.

DETAILED DESCRIPTION

Figure 2:
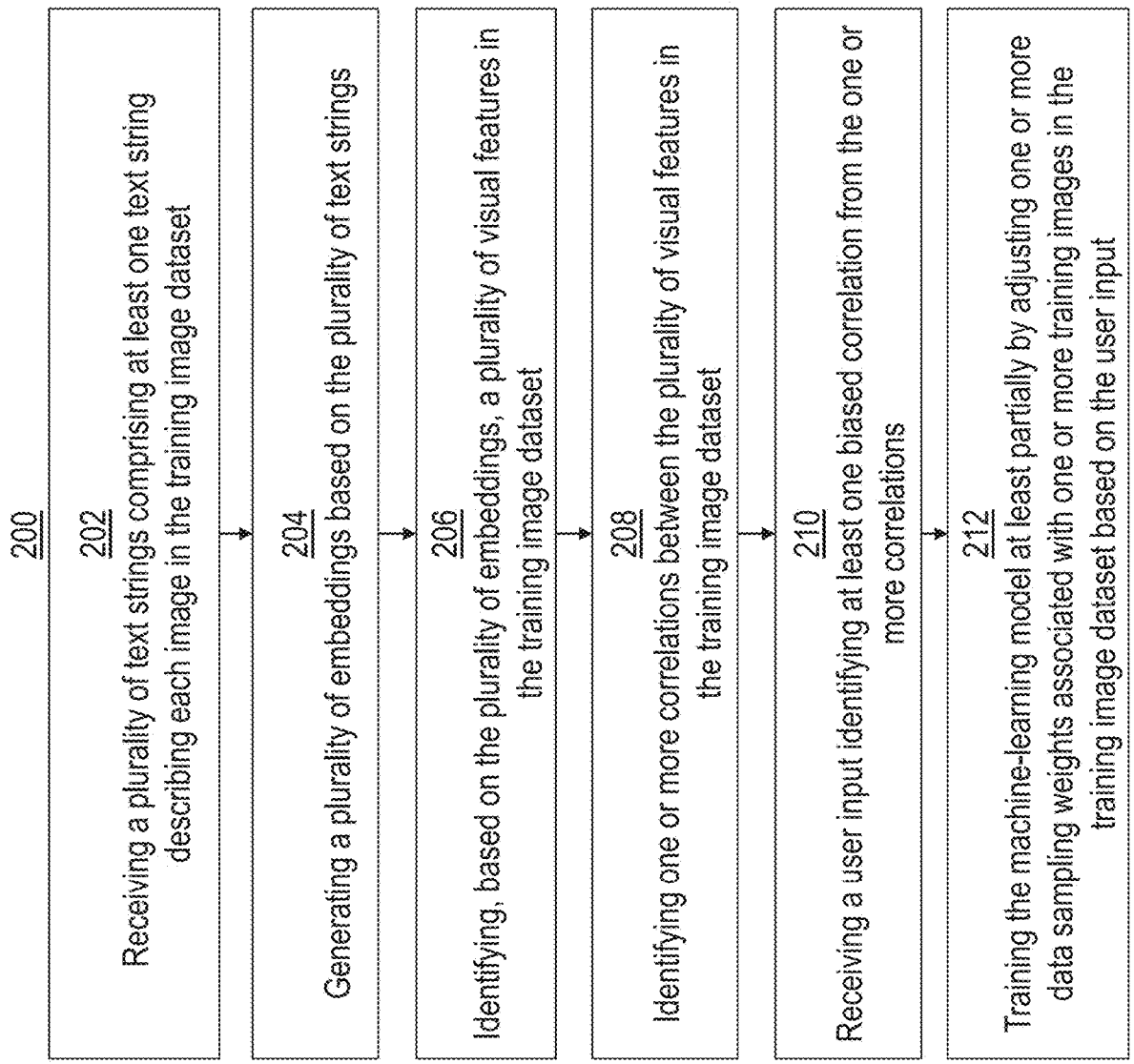
FIG. 2 illustrates an exemplary process for reducing bias in a training image dataset for training a machine-learning model, in accordance with some embodiments.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Disclosed herein are systems, electronic devices, methods, apparatuses, and non-transitory storage media for reducing bias in a training image dataset for training a machine-learning model. Given a corpus of pairs of images and corresponding text descriptions (e.g., descriptive captions for the images), the system can distill the corpus into a hierarchy of categories (major subjects in the images) and subordinate features (different attributes or states of a subject) via text embedding clustering. The features are extracted from the semantic components of the descriptions, so they represent image content comprehensively, not limited by prior knowledge or cross-modal alignment. The system can then identify pairwise feature correlations based on their occurrence across all data samples. It should be noted that identified correlated features are not necessarily biased: for example, a correlation between "teeth" and "smile" in a dataset of face images is both expected and benign. Thus, a human-in-the-loop step can be provided, where a human user such as a domain expert reviews the identified correlations and selects the ones that may negatively impact the downstream classification task (i.e., sensitive/spurious correlations). Finally, based on the selected correlations, the system can automatically mitigate model bias, for example, via a data re-weighting strategy, without a requirement for sensitive group labels.

An exemplary system can receive a plurality of text strings comprising at least one text string describing each image in the training image dataset and generate a plurality of embeddings based on the plurality of text strings. The system can then identify, based on the plurality of embeddings, a plurality of visual features in the training image dataset and further identify one or more correlations between the plurality of visual features in the training image dataset. The system can present the one or more correlations to a user, and the user can indicate whether each of the one or more correlations is benign or not. The system can receive a user input identifying at least one biased correlation from the one or more correlations and train the machine-learning model at least partially by adjusting one or more data sampling weights associated with one or more training images in the training image dataset based on the user input.

Accordingly, embodiments of the present disclosure can discover comprehensive sensitive correlations in a dataset based on common-sense descriptions and mitigate biases which have not been explored in literature. The common-sense reasoning approach can discover human-interpretable "feature clusters" (beyond the image embedding level) existing in image datasets. Based on the clusters, a formulation is provided to derive pairwise image feature correlations, order them by significance, and allow human domain experts to identify sensitive correlations for further intervention. The approach leads to a new perspective on bias problems and resolves the limitation of latent space based de-biasing which tends to overlook or mis-identify non-dominant features. Embodiments of the present disclosure can apply common-sense reasoning to descriptions generated by humans, which will naturally highlight the features most relevant or noticeable to humans regardless of their size or subtlety in the overall image and indicate how their correlation to the target will cause downstream bias. Empirical evidence show that embodiments of the present disclosure can discover novel subtle sensitive features and model biases for classification tasks, which has not been previously identified and addressed. Furthermore, the system can adjust data sampling weights and achieve state-of-the-art results bias mitigation results. Thus, embodiments of the present disclosure can improve the functioning of the computer system, result in more efficient training of machine-learning models with reduced bias and identification/retraining of biased machine-learning models.

Embodiments of the present disclosure include techniques for discovering and reducing bias in training datasets for training machine-learning models, including a common-sense bias discovery method (also referred to as CSBD). Given a corpus of (image, text description) pairs, an exemplary system can analyze feature correlations (e.g., pairwise feature correlations) based on text descriptions (e.g., common-sense text descriptions). This can be followed by a human-in-the-loop step, where a domain expert reviews the identified correlations and selects the ones that may negatively impact the downstream classification task. Based on the selected correlations, the system can mitigate model bias via a data re-weighting strategy, without a requirement for sensitive group labels.

FIG. 2 illustrates an exemplary process 200 for reducing bias in a training image dataset for training a machine-learning model, in accordance with some embodiments. Process 200 is performed, for example, using one or more electronic devices implementing a software platform. In some examples, process 200 is performed using a client-server system, and the blocks of process 200 are divided up in any manner between the server and a client device. In other examples, the blocks of process 200 are divided up between the server and multiple client devices. Thus, while portions of process 200 are described herein as being performed by particular devices of a client-server system, it will be appreciated that process 200 is not so limited. In other examples, process 200 is performed using only a client device or only multiple client devices. In process 200, some blocks are, optionally, combined, the order of some blocks is, optionally, changed, and some blocks are, optionally, omitted. In some examples, additional steps may be performed in combination with the process 200. Accordingly, the operations as illustrated (and described in greater detail below) are exemplary by nature and, as such, should not be viewed as limiting.

At block 202, an exemplary system (e.g., one or more electronic devices) receives a plurality of text strings comprising at least one text string describing each image in the training image dataset. The training image dataset comprises a plurality of images. Each image can depict a person, an object, a scene, or any combination thereof. For each image, at least one text string associated with the image can be generated to describe what the image depicts, for example, what person, object, and/or scene is depicted and the attribute(s) of the person, object, and/or scene. For example, for an image depicting a person, the corresponding at least one text string can be "The girl has a big smile." In some embodiments, the at least one text string is generated by one or more human annotators. In some embodiments, the at least one text string is a natural-language text string. In some embodiments, the at least one text string can be retrieved from one or more databases. In some embodiments, the at least one text string may be provided by pre-trained caption generation models.

At block 204, the system generates a plurality of embeddings based on the plurality of text strings. The system extracts one or more tokens from each text string from block 202. For example, for a text string "The girl has a big smile," the system can extract tokens "The girl" and "a big smile." This way, the text string is broken down into tokens to align with local visual features. In some embodiments, the system can use a text parsing tool, such as SceneGraphParser, on the text strings to split the sentences and extract spans of phrases (e.g., noun phrases) as semantic rich components, although it should be appreciated that any text parsing tool can be used to split sentences into tokens.

After extracting tokens from the text strings, the system can generate an embedding based on each token using a machine-learning model. An embedding is a representation (e.g., a vector representation) of the token. In some embodiments, the machine-learning model can be an encoder model such as a pretrained Universal Sentence Encoder (USE) and Contrastive Language-Image Pretraining (CLIP) model, but it should be appreciated that any model that can encode text into an embedding can be used. In some embodiments, M denotes the total number of extracted tokens, and the embedding dimension is reduced to dimension d (tuneable hyper-parameter) using a dimensionality reduction algorithm such as Principal Component Analysis (PCA) or Uniform Manifold Approximation and Projection (UMAP) before being clustered in the next step.

At block 206, the system identifies, based on the plurality of embeddings, a plurality of visual features in the training image dataset. For example, the system can cluster the plurality of embeddings into various embedding clusters, and a visual feature can be identified based on each embedding cluster.

In some embodiments, block 206 comprises a two-stage clustering process. In the first stage, the system can cluster the plurality of embeddings into a plurality of categories. For example, all phrase embeddings $A \in \mathbb{R}^d$ are clustered into C categories (i.e., C number of category clusters), where C is a tunable hyper-parameter. The clustering can be performed using any clustering techniques, such as a K-means clustering algorithm, a hierarchical clustering algorithm, a mean shift algorithm, a Gaussian mixture model, or an agglomerative clustering algorithm. It should be appreciated that datasets including more diverse categories of objects should have a larger C.

In the second stage, the system clusters embeddings in each category of the plurality of categories to identify the plurality of visual features. A visual feature can refer to a cluster of semantically similar phrases. For example, each category cluster c is further clustered into a number of features via any clustering techniques such as a K-means clustering algorithm, a hierarchical clustering algorithm, a mean shift algorithm, a Gaussian mixture model, or an agglomerative clustering algorithm. In some embodiments, each category cluster c is clustered into a predefined number $F_c$ number of features. For example, if the category cluster is "smiling" and $F_c=3$, example features can be "a mild smile", "no smile", and "beaming smile". The value of $F_c$ can be determined on a per-cluster basis. For example, a pre-defined upper bound $\sigma_{max}$ can be set and, for each category cluster c, $F_c$ is set to be the smallest integer such that the mean within-cluster variance of the features (i.e., the variance among features within each of the $F_c$ clusters) is lower than $\sigma_{max}$. The within-cluster variance of a feature can be calculated, for example, by the sum of the squared distance between the centroid point and each point of the cluster; this is the standard measure of spread used in K-means clustering. In some embodiments, the system can finetune the upper bound $\sigma_{max}$ to discover meaningful feature correlations. If $\sigma_{max}$ is too small, then redundant clusters are produced for a same feature, which affects the feature's distribution and thus the correlation measurement. If $\sigma_{max}$ is too large, then discrepant features are mixed in a cluster and the cluster's semantic meaning is lost.

Using the variance instead of a fixed number of clusters for the second clustering allows each category to contain different number of features. This is technically advantageous because some categories can have a natural binary split (e.g., eyeglasses/no eyeglasses) while others may have a much wider range of features (e.g., age groups). Accordingly, the system can obtain a hierarchy of visual feature descriptions that comprehensively cover the dataset and are consistent with common sense descriptions.

At block 208, the system identifies one or more correlations between the plurality of visual features in the training image dataset. Specifically, having extracted a set of feature clusters in block 206, the system next identifies feature co-occurrence within the dataset. This allows the identification of spurious correlations relevant to the target task, which may cause model bias.

In some embodiments, to identify the one or more correlations, the system calculates a measurement indicative of an association between two visual features of the plurality of visual features. The measurement may comprise, for example, a Matthews correlation coefficient or a Pearson coefficient. The system then compares the measurement with a predefined threshold.

In one exemplary implementation, the system can first generate a one-hot indicator for each feature: $t_f = [t_1, t_2, \ldots, t_N]$, where N is the size of the dataset, and $t_i=1$ if the $f^{th}$ feature occurs in the $i^{th}$ image's description, otherwise $t_i=0$. Second, the phi coefficient $\phi$ (also known as the Matthews correlation coefficient) is used to measure the association between every two indicators. The phi coefficient between two indicators $t_f$ and $t_{f'}$ is defined as follows:

$$\phi_{t_f t_{f'}} = \frac{x_{11}x_{00} - x_{10}x_{01}}{\sqrt{x_1 * x_0 * x_{*0} * x_{*1}}}$$

where $c \in [0,C)$, $f,f' \in [0,F_c]$, and $x_{11} = \|t_f \cdot t_{f'}\|_1$, $x_{01} = \|(\neg t_f) \cdot t_{f'}\|_1$, $x_{10} = \|t_f \cdot (\neg t_{f'})\|_1$, $x_{00} = \|(\neg t_f) \cdot (\neg t_{f'})\|_1$, $x_{1*} = \|t_f\|_1$, $x_{0*} = \|\neg t_f\|_1$, $x_{*0} = \|\neg t_{f'}\|_1$, $x_{*1} = \|t_{f'}\|_1$.

with $\neg$ denotes element-wise negation, $\|\cdot\|_1$ denotes the $L^1$ norm.

Two features are positively correlated (likely to co-occur in an image) if $\phi$ is a positive value, and are negatively correlated (rarely co-occur) if $\phi$ is a negative value. A $\phi$ near zero indicates two features which co-occur randomly. Features that have high correlation with any target features can become shortcuts for model learning and cause biased decision-making toward certain subgroups. Thus, feature pairs which have $|\phi|>z$ (where z is an empirically decided threshold and can be adjusted) are returned for examination by a human user, as discussed below in block 210.

At block 210, the system receives a user input identifying at least one biased correlation from the one or more correlations. For example, the system can display the one or more correlations between the plurality of visual features in the training image dataset (e.g., text descriptions of each correlation), and the user can indicate whether each of the one or more correlations are benign or not. Benign correlation refers to a correlation between two features that are naturally connected, such as "teeth visible" with "a smile", and most facial features with "the face". These correlations are usually robust and generalizable, and the user can identify them as benign. In some embodiments, instead of presenting all the correlations identified in block 208, the system displays only a subset of the identified correlations, such as sensitive correlations that may affect the target task (e.g., race/gender/disability/sexuality). Thus, the human-in-the-loop component allows flexibility and transparency for bias mitigation.

At block 212, the system trains the machine-learning model at least partially by adjusting one or more data sampling weights associated with one or more training images in the training image dataset based on the user input. Specifically, the system can mitigate bias in the training images such that any machine-learning model (e.g., an image classification model, an object detection and segmentation model, or any other vision recognition tasks and models) trained using the training images can provide less biased outputs. In some embodiments, the classification model is implemented as a residual neural network (ResNet), a convolutional neural network (CNN), an inception module, MobileNet, VGGNet, ensemble models, support vector machines (SVM), etc. In some embodiments, the system adjusts one or more data sampling weights associated with one or more training images in the training image dataset based on the user input. The one or more data sampling weights can be adjusted to reduce the at least one biased correlation. In some embodiments, the machine-learning model is pre-trained and the system can re-train the machine-learning model using the adjusted training dataset. In some embodiments, the machine-learning model can be iteratively retrained over time based on the adjusted training dataset and/or new training datasets.

In some embodiments, given a set of targets and human-identified sensitive features correlated to them, the system balances the distribution of samples with vs. without each sensitive feature across the targets. For example, if the downstream task is smile detection, then images with, for example, the "man" feature and without the feature should have the same ratio of positive to negative target labels. This condition ensures a statistical independence between each feature and target.

In some embodiments, the new data sampling weights are calculated as follows. We denote the dataset as D, target set as Y, target feature indicators obtained from the last step as $t_Y = \{t_y: y \in Y\}$, and the sensitive features indicator as $t_s$. Further, we denote the original feature distribution with respect to the targets as $P_D(t_s|t_Y)$ and $P_D(\neg t_s|t_Y)$, with P representing probability. The sampling weight $W(t_s|t_Y)$ for images with feature s across the targets is defined by the following equation:

$$P_D(t_s|t_Y) \cdot W(t_s|t_Y) = P_D(\neg t_s..t_Y)$$

If the dataset target feature distribution is already balanced w·r·t the sensitive feature, the sampling weight $W(t_s|t_Y)$ would be equal to 1. The re-weighted sampling probabilities will remove the correlation between sensitive feature s and target features. The intervention is to treat or mitigate one sensitive feature s and model bias it causes. In some embodiments, the system also performs randomized augmentations alongside the sampling weights to introduce data diversity.

In some embodiments, as an addition to or alternative to block 212, the system can determine, based on the user input, if one or more machine-learning models trained using the training image dataset is biased. For example, if user has identified one or more biased correlations, the system can determine that a machine-learning model that has been trained using the biased training image dataset is biased as well. For example, if the user identified a biased correlation between "woman" and "smile" in the training image dataset, the system could determine that a smile detection model that has been trained using the biased training image dataset is biased as well.

Figure 3:
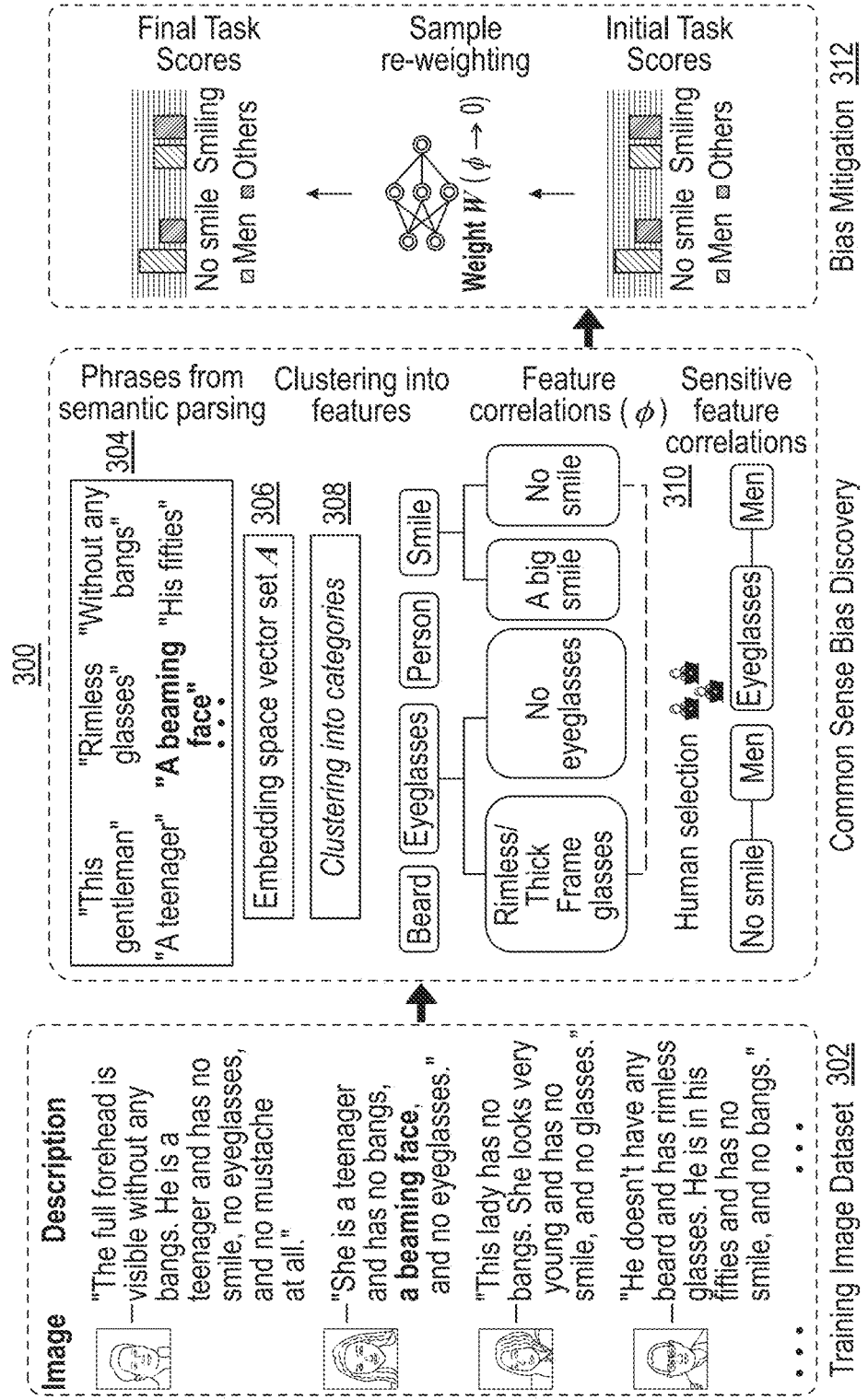
FIG. 3 illustrates an exemplary process for reducing bias in a training image dataset for training a machine-learning model, in accordance with some embodiments.

FIG. 3 illustrates an exemplary process 300 for reducing bias in a training image dataset for training a machine-learning model, in accordance with some embodiments. A training image dataset 302 includes a plurality of images. Further, each image is associated one or more text strings that describe the image. For example, the first image is associated with the text strings "The full forehead is visible without any bangs. He is a teenager and has no smile, no eyeglasses, and no mustache at all."

The text strings of all images in the training image dataset 302 are parsed into a plurality of semantically meaningful phrases or tokens 304, such as "This gentleman," "Rimless glasses," "Without any bangs," etc. An embedding (or phrase embedding) is generated for each token in the plurality of tokens 304, resulting in the embedding space vector set A 306. A two-stage clustering process 308 on the vector set generates a list of common-sense feature clusters. Then, correlations between every two feature distributions are computed and highly-correlated features (e.g., features having a correlation metric exceeding a threshold) are examined by a human for mitigation at stage 310. The human can identify each correlation as either benign or sensitive/spurious. Sensitive correlations, such as a correlation between "no smile" and "men" and a correlation between "eyeglasses" and "men", can introduce bias in a downstream model. These correlations are mitigated in stage 312 by adjusting image sampling weights during training, calculated automatically from the derived feature distributions.

Figure 4:
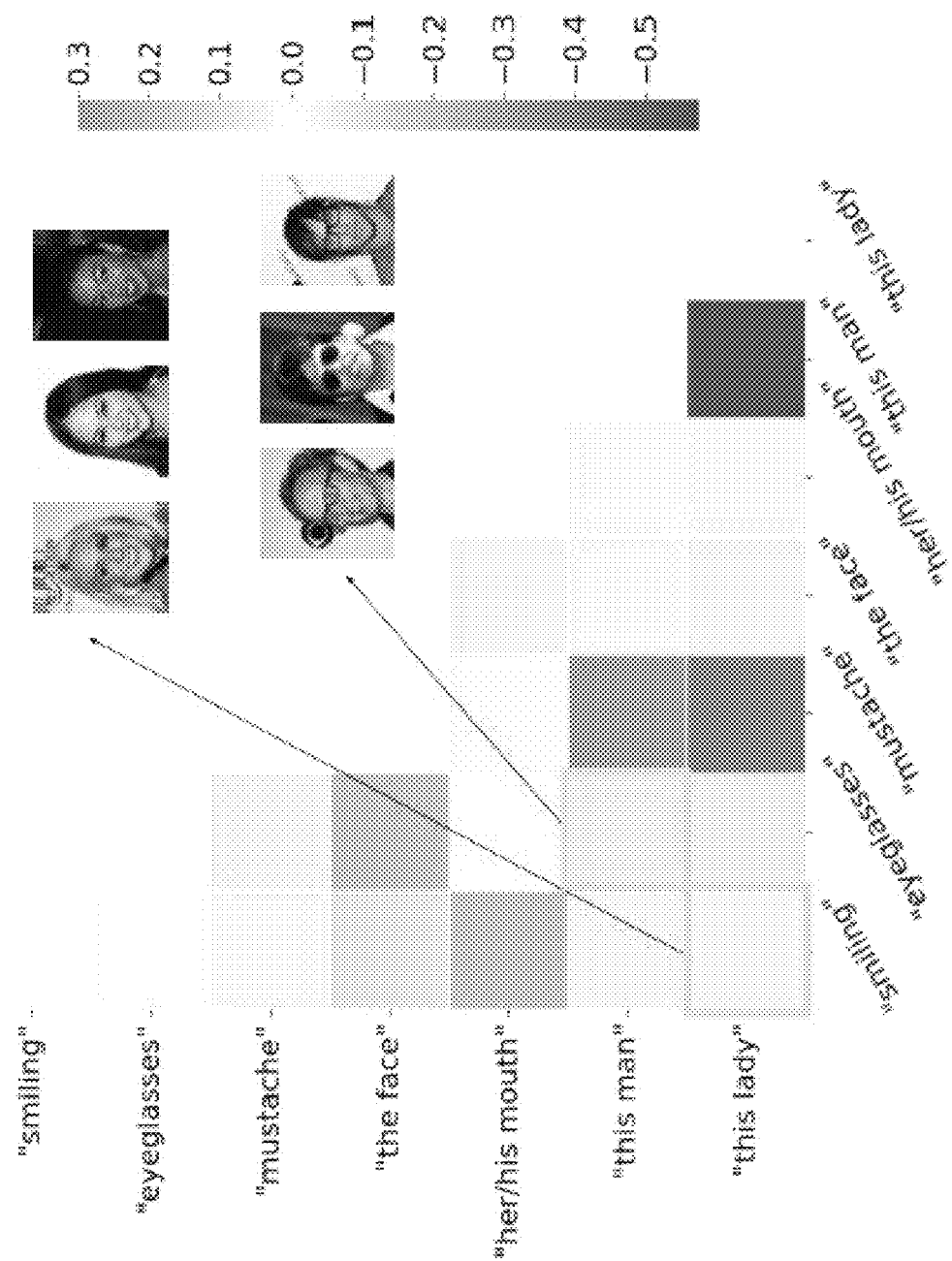
FIG. 4 illustrates exemplary sensitive features, in accordance with some embodiments.
Figure 5:
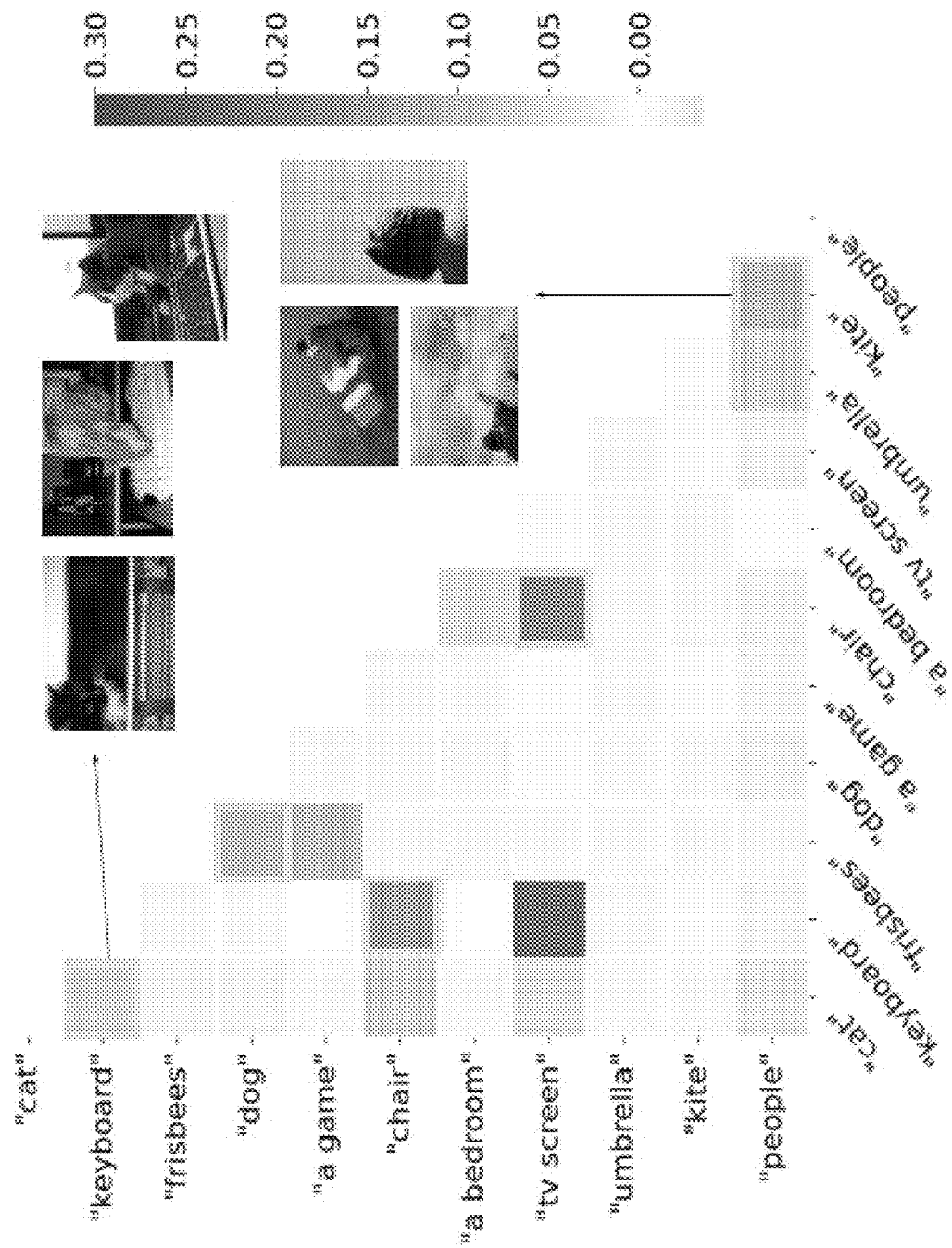
FIG. 5 illustrates exemplary sensitive features, in accordance with some embodiments.

FIGS. 4 and 5 illustrate examples of discovered correlations in the CelebA dataset and the MS-COCO dataset, respectively, and the correlation coefficients. Sensitive correlations are circled in yellow, such as "the lady" and "smiling". The others are viewed as benign, like "man" and "mustache".

EXAMPLES

Empirical data shows that the sensitively correlated features reasoned by embodiments of the present disclosure align with model bias on popular benchmark datasets. Empirical data further shows that prior correlation-robust methods cannot prevent such bias and that the reasoned bias can be curable using data-wise intervention.

Datasets

CelebA-Dialog is a visual-language dataset including captions for images in CelebA, a popular face recognition benchmark dataset containing 40 facial attributes. Each caption describes 5 fine-grained attributes: "Bangs", "Eyeglasses", "Beard", "Smiling", and "Age". Since the captions are generated as natural language sentences, they also include other common-sense information like pronouns and people titles (phrases like "the man" or "the lady"). Embodiments of the present disclosure can identify new correlations not found by other methods. For classification tasks, the target labels "Smiling" and "Eyeglasses" are selected as shown in FIG. 6, and the sensitive group label is selected to be "Male" (here "label" refers to the ground truth binary labels). The labels are selected because their corresponding caption-inferred features are discovered by embodiments of the present disclosure to be highly correlated and thus may cause downstream model bias. FIG. 6 illustrates mitigation of common-sense bias discovered by CSBD towards the target ground truth label (Target): (1) "Smiling" and (2) "Eyeglasses", among the sensitive group label: "Male" and others, on CelebA dataset. The average classification accuracy of all target-sensitive groups (Avg.) and the worst performing group (Worst) are reported. Results are based on three independent runs and standard deviation is given in parenthesis. The best results are marked in bold and the second best results are underlined.

MS-COCO 2014 is a large-scale scene image datasets including annotations for 80 objects, and each image has 5 descriptive captions generated independently. One caption is randomly selected for each image. Feature correlation analysis is performed and part of the sensitive correlations detected are displayed in FIG. 7. Based on the feature correlation analysis, 7 target and sensitive label pairs are selected for training downstream models and evaluating bias, as listed in FIG. 8. For example, a model is trained for recognizing "Dog" and the model is then evaluated to identify performance disparity for images with/without "Frisbee". Binary classification is performed on each target label. This is because although MS-COCO is more used for multi-label classification, certain labels will need to be treated as auxiliary features in order to reveal their effects on the target and thus study bias caused by feature correlations. FIG. 8 illustrates mitigation of common-sense bias discovered by CSBD between each target ground truth label (Target) and sensitive group label (Sensitive), for binary object classification task on MS-COCO dataset. The average classification accuracy of all target-sensitive groups (Avg.), and the worst performing group (Worst), resulted from feature correlations, are reported.

Implementation

For correlation reasoning, the phrases from the description corpus are encoded to vectors in 512 dimensions using Universal Sentence Encoder (USE). The dimension is reduced using PCA to 30 for the CelebA dataset and 100 for MS-COCO, which ensure that the sum of the PCA components' explained variance was over 90%. The embedding vectors are then scaled to unit norm before being clustered using K-means. The category cluster number C is set to 8 for CelebA and 50 for MS-COCO. These numbers are empirically selected to ensure no obvious discrepancies in discovered clusters: that is, no redundant clusters or multiple categories in same clusters. For the second step which generates feature clusters, the upper bound of the within-cluster variance $\sigma_{max}$ is set to 0.15 for CelebA and 0.5 for MSCOCO. The threshold z for correlation coefficient between two feature indicators is chosen to be 0.05 (correlation significance is verified by Chi-square test). Empirically, feature correlations higher than z cause bias on the datasets used.

For the downstream training, the same training, validation, and testing split are used for the CelebA dataset and the MS-COCO dataset. However, because of label scarcity of individual objects relative to the entire dataset (for example, only 3% of images in MS-COCO contain "Cat" and 2% of images contain "Kite"), to avoid class imbalance problem introducing confounding bias to the classifier, subsets of the dataset splits are randomly taken which include 50% of each target label.

Correlation Discovery Results

CelebA. Semantic parsing of the image descriptions generates M=1,283,552 phrases for CelebA dataset, and applying CSBD outputs 72 feature pairs that have an absolute correlation coefficient higher than z=0.05. By manual check, it is determined that the features "smiling" and "eyeglasses" are both sensitively correlated to people title features "the man, the guy, . . . " and "the lady, the girl, . . . ", while other naturally related features like "mouth" and "smiling" are designated as benign. The correlation values between sensitive features, along with selected benign correlations, are visualized in FIG. 4. FIG. 4 illustrates examples of discovered correlations in CelebA dataset and the correlation coefficients. Sensitive correlations are circled in yellow, such as "the lady" and "smiling". The others are viewed as benign, like "man" and "mustache".

MS-COCO. Semantic parsing for descriptions generates M=253,467 phrases. CSBD outputs 220 correlated feature pairs for the MS-COCO dataset. The benign examples include "frisbee" and "a game", "waves" and "ocean", etc. The sensitive ones include "cat" and "couch", "kite" and "people"; FIG. 8 lists the 7 examples chosen for bias mitigation. Although these connections are intuitive, models can learn and utilize the feature dependence: for example, recognition of a kite in an image may not be based on its shape but whether it co-occurs with people. Selected results are visualized in FIG. 5. FIG. 5 illustrates examples of discovered correlations in MS-COCO dataset and the correlation coefficients. Sensitive correlations are circled in yellow. Some examples of sensitive correlations which may be intuitive but not robust are marked in FIG. 7. For example, it is intuitive that "cake" frequently co-occurs with "box", but it is undesirable for a model's recognition of a box to depend on the presence or absence of a cake. Each feature is a cluster of descriptive phrases and only 1-2 representative phrases are shown. The description-derived features include those not represented in the dataset labels, and expose highly correlated ones, such as "bathroom" and "vase".

Correlation Robustness Evaluation

The robustness of quantified correlations was analyzed, considering that descriptions are generated by humans who may only select features relevant or noticeable to them, causing incompleteness or faults. Incorrect and low-quality captions have been previously identified in MS-COCO. 20 labels and the corresponding features derived from captions in MS-COCO are randomly selected. The Pearson correlation coefficient between each label distribution and feature distribution were computed across all data samples, resulting in the coefficient of 0.545 (95% confidence interval 0.153 to 0.937). The value of the correlation coefficient shows that the label and feature distribution have a moderate correlation, which varies across different features. The result is expected because the correlation is affected by both caption quality (captions may incorrectly describe ground truth label) and text embedding clustering (text with same semantics may not be encoded closely in representation space).

The robustness of discovered correlation features (or common sense bias; to avoid confusion to the correlation test here, we use the term "bias") was also tested by randomly selecting labels and features and calculating their correlation coefficient. Bias appearance between each feature and each of the remaining features is computed and the same bias measurement is performed using label classes. The correlation coefficient between the two measurements is 0.781 (95% confidence interval 0.417 to 1.0), which is much higher and includes lower variance than the result for feature distribution. The analysis indicates that the proposed method likely works on the level of the dataset, rather than at the individual image level, to find trends in correlation value. Thus, it has certain robustness to noise and incompleteness included in image descriptions.

Bias Mitigation Results

To verify whether the spurious feature correlations discovered by CSBD can indicate and help mitigate downstream model bias, image classification results on CelebA and MS-COCO dataset are shown in FIGS. 6 and 8. The worst group performance is used to evaluate model bias, and the groups are all combinations of target label and sensitive feature label pairs. Baseline model without bias mitigation (Vanilla) for all tasks presents a gap between the worst-performing group (Worst) and the group average (Avg.), indicating the classifier's bias. For example, images containing Chair but no TV obtain an accuracy of 0.726, 19% lower than the average accuracy (FIG. 8). CSBD re-weights sampling probabilities to break the correlations in the dataset, using the reweighting factor disclosed herein. FIGS. 6 and 8 show that CSBD successfully mitigates model bias (most improved Worst Group Performance) on all targets, outperforming the baseline and other de-biasing methods: LfF, DebiAN, PGD, and BPA. Moreover, model classification quality will not be degraded: CSBD always obtains the highest or the second highest average group accuracy.

FIGS. 9A-E illustrates T-SNE results for cat classifiers ("Couch" as sensitive label) trained with MS-COCO dataset. Target attributes ("Cat" and "No cat") are most linearly separable with CSBD-trained embeddings € compared to the baseline and other bias mitigation methods (A-D). Methods which can discover pseudo sensitive groups are marked with group assignment by dot and cross. Comparing to the real groups ("Couch" and "No couch") across which bias is expected to be treated, CSBD obtains the closest estimation.

The advantage of CSBD over other unsupervised bias mitigation methods are shown by the common-sense bias's differentiation to embedding-based bias, specifically, how bias affects model predictions and the treatment required. Image embeddings are extracted from the fully connected layer of the "Cat" classification models trained with MS-COCO. Model bias can be observed from the vanilla baseline with no intervention in FIG. 9A: while target classes are separable for samples without sensitive feature (orange and green dots), for images with sensitive feature the model's prediction boundary for the target is blurred (blue and red dots are partially mixed).

This is different to the specific bias types the comparison methods study, that sensitive features are easily distinguishable in embedding space. LfF assumes that the biased model presents an unintended decision rule to classify sensitive features, which appear in images aligning with the decision rule. However, this unintended decision rule does not generate in the biased model training in FIG. 9A. DebiAN assigns pseudo sensitive groups as two sample splits which get unequal positive prediction rates, which cannot capture meaningful features, as shown in FIG. 9B. PGD does not split pseudo groups but identifies bias conflicting samples by model-computed gradient. Re-weighting based on gradients does not correct the decision boundary, as shown in FIG. 9C, indicating that samples with the sensitive feature that cause bias are not precisely identified. BPA clusters embeddings and assume different clusters represent different sensitive features. However, embeddings of samples with/without couch feature are not separable and the method only discovers target-related clusters, as shown in FIG. 9D. In sum, for common-sense bias caused by the sensitive features not pronounced in image embeddings, methods which rely only on the image show ineffective bias discovery and mitigation.

In contrast, text-based reasoning provides high-level abstract understanding of the image itself, regardless of how model parameters or embeddings encode the image. Such understanding discovers sensitive features correlated to the target, including "a couch", precisely. CSBD removes the correlation from dataset and trains a model with much clearer decision boundary for "Cat", not affected by presence of "Couch" as shown in FIG. 9E. Though the reasoning is not based on true feature labels but coarse descriptions with incomplete information (which explains why not all "Couch" samples are classified in a group), it can still quantify data feature imbalance and lead to effective bias mitigation.

Figure 10:
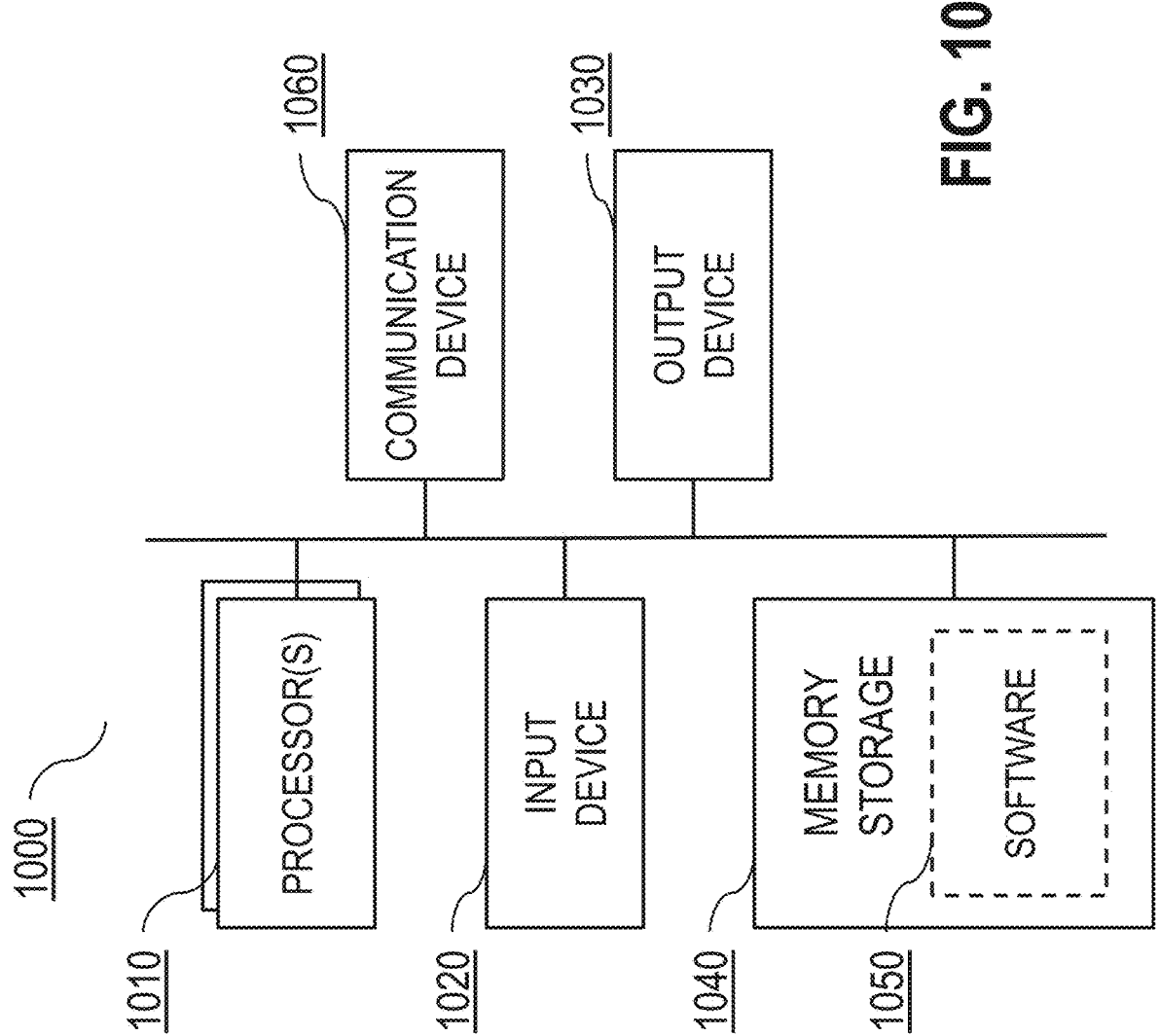
FIG. 10 illustrates an exemplary electronic device, in accordance with some embodiments.

The operations described above are optionally implemented by components depicted in FIG. 10. It would be clear to a person having ordinary skill in the art how other processes are implemented based on the components depicted in FIG. 10.

FIG. 10 illustrates an example of a computing device in accordance with one embodiment. Device 1000 can be a host computer connected to a network. Device 1000 can be a client computer or a server. As shown in FIG. 10, device 1000 can be any suitable type of microprocessor-based device, such as a personal computer, workstation, server or handheld computing device (portable electronic device) such as a phone or tablet. The device can include, for example, one or more of processor 1010, input device 1020, output device 1030, storage 1040, and communication device 1060. Input device 1020 and output device 1030 can generally correspond to those described above and can either be connectable or integrated with the computer.

Input device 1020 can be any suitable device that provides input, such as a touch screen, keyboard or keypad, mouse, or voice-recognition device. Output device 1030 can be any suitable device that provides output, such as a touch screen, haptics device, or speaker.

Storage 1040 can be any suitable device that provides storage, such as an electrical, magnetic or optical memory including a RAM, cache, hard drive, or removable storage disk. Communication device 1060 can include any suitable device capable of transmitting and receiving signals over a network, such as a network interface chip or device. The components of the computer can be connected in any suitable manner, such as via a physical bus or wirelessly.

Software 1050, which can be stored in storage 1040 and executed by processor 1010, can include, for example, the programming that embodies the functionality of the present disclosure (e.g., as embodied in the devices as described above).

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1000 can implement any operating system suitable for operating on the network. Software 1050 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific examples or aspects. However, the illustrative discussions above are not intended to be exhaustive or to limit the invention to the precise forms disclosed. For the purpose of clarity and a concise description, features are described herein as part of the same or separate variations; however, it will be appreciated that the scope of the disclosure includes variations having combinations of all or some of the features described. Many modifications and variations are possible in view of the above teachings. The variations were chosen and described in order to best explain the principles of the techniques and their practical applications. Others skilled in the art are thereby enabled to best utilize the techniques and various variations with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed is:

1. A method for reducing bias in a training image dataset for training a machine-learning model, comprising:
   receiving a plurality of text strings comprising at least one text string describing each image in the training image dataset;
   generating a plurality of embeddings based on the plurality of text strings;
   identifying, based on the plurality of embeddings, a plurality of visual features in the training image dataset;
   identifying one or more correlations between the plurality of visual features in the training image dataset;
   receiving a user input identifying at least one biased correlation from the one or more correlations; and
   training the machine-learning model at least partially by adjusting one or more data sampling weights associated with one or more training images in the training image dataset based on the user input.

2. The method of claim 1, wherein the machine-learning model is an image classification model, an object recognition model, an object segmentation model, or any combination thereof.

3. The method of claim 1, wherein the one or more data sampling weights are adjusted to reduce the at least one biased correlation.

4. The method of claim 1, further comprising:
   determining, based on the user input, if one or more machine-learning models trained using the training image dataset is biased.

5. The method of claim 1, wherein generating the plurality of embeddings comprises:
   for each image in the training image dataset:
      extracting one or more tokens from the at least one text string describing the respective image;
      generating, based on each extracted token, an embedding using an encoder model.

6. The method of claim 5, wherein the encoder model is a Universal Sentence Encoder (USE) or a Contrastive Language-Image Pretraining (CLIP) model.

7. The method of claim 1, wherein identifying the plurality of visual features in the training image dataset comprises:
   clustering the plurality of embeddings into a plurality of categories; and
   clustering embeddings in each category of the plurality of categories to identify the plurality of visual features.

8. The method of claim 7, wherein clustering the plurality of embeddings is performed using a K-means clustering algorithm, a hierarchical clustering algorithm, a mean shift algorithm, a Gaussian mixture model, or an agglomerative clustering algorithm.

9. The method of claim 7, wherein clustering the embeddings in each category is performed using a K-means clustering algorithm, a hierarchical clustering algorithm, a mean shift algorithm, a Gaussian mixture model, or an agglomerative clustering algorithm.

10. The method of claim 1, wherein identifying the one or more correlations between the plurality of visual features in the training image dataset comprises:
  calculating a measurement indicative of an association between two visual features of the plurality of visual features; and
  comparing the measurement with a predefined threshold.

11. The method of claim 10, wherein the measurement comprises a Matthews correlation coefficient or a Pearson coefficient.

12. The method of claim 1, further comprising: displaying the one or more correlations between the plurality of visual features in the training image dataset.

13. The method of claim 1, further comprising: receiving a user input identifying at least one benign correlation from the one or more correlations.

14. The method of claim 1, wherein the plurality of text strings are generated by one or more human annotators.

15. The method of claim 1, wherein each text string of the plurality of text strings describes a person, an object, an attribute of the person, an attribute of the object, or any combination thereof.

16. A non-transitory computer-readable storage medium storing one or more programs for reducing bias in a training image dataset for training a machine-learning model, the one or more programs comprising instructions, which when executed by one or more processors of an electronic device, cause the electronic device to:
  receive a plurality of text strings comprising at least one text string describing each image in the training image dataset;
  generate a plurality of embeddings based on the plurality of text strings;
  identify, based on the plurality of embeddings, a plurality of visual features in the training image dataset;
  identify one or more correlations between the plurality of visual features in the training image dataset;
  receive a user input identifying at least one biased correlation from the one or more correlations; and
  train the machine-learning model at least partially by adjusting one or more data sampling weights associated with one or more training images in the training image dataset based on the user input.

17. A system for reducing bias in a training image dataset for training a machine-learning model, comprising:
  one or more processors;
  one or more memories; and
  one or more programs, wherein the one or more programs are stored in the one or more memories and configured to be executed by the one or more processors, the one or more programs including instructions for:
    receiving a plurality of text strings comprising at least one text string describing each image in the training image dataset;
    generating a plurality of embeddings based on the plurality of text strings;
    identifying, based on the plurality of embeddings, a plurality of visual features in the training image dataset;
    identifying one or more correlations between the plurality of visual features in the training image dataset;
    receiving a user input identifying at least one biased correlation from the one or more correlations; and
    training the machine-learning model at least partially by adjusting one or more data sampling weights associated with one or more training images in the training image dataset based on the user input.

\* \* \* \* \*